United States Patent
Göhring et al.

(10) Patent No.: US 10,910,969 B2
(45) Date of Patent: Feb. 2, 2021

(54) DEVICE FOR ISOLATED FAN CONTROL AND FAN SYSTEM AND CONTROL METHOD

(71) Applicant: EBM-PAPST ST. GEORGEN GMBH & CO. KG, St. Georgen (DE)

(72) Inventors: Mark Göhring, Schonach (DE); Harald Schmid, Emmingen-Liptingen (DE)

(73) Assignee: ebm-papst St. Georgen GmbH & Co. KG, St. Georgen (DE)

( * ) Notice: Subject to any disclaimer, the term of this patent is extended or adjusted under 35 U.S.C. 154(b) by 0 days.

(21) Appl. No.: 16/342,346

(22) PCT Filed: Jul. 20, 2017

(86) PCT No.: PCT/EP2017/068400
§ 371 (c)(1),
(2) Date: Apr. 16, 2019

(87) PCT Pub. No.: WO2018/072903
PCT Pub. Date: Apr. 26, 2018

(65) Prior Publication Data
US 2020/0052624 A1 Feb. 13, 2020

(30) Foreign Application Priority Data
Oct. 18, 2016 (DE) ........................ 10 2016 119 826

(51) Int. Cl.
| | | |
|---|---|---|
| H02P 1/04 | (2006.01) | |
| H02P 7/291 | (2016.01) | |
| F04D 27/00 | (2006.01) | |
| G05B 19/05 | (2006.01) | |
| F04D 25/06 | (2006.01) | |

(52) U.S. Cl.
CPC .............. *H02P 7/291* (2016.02); *F04D 27/00* (2013.01); *G05B 19/05* (2013.01); *F04D 25/06* (2013.01); *G05B 2219/1161* (2013.01)

(58) Field of Classification Search
CPC ....... G05B 2219/1161; H02P 7/29; H02P 6/08
See application file for complete search history.

(56) References Cited

U.S. PATENT DOCUMENTS

| | | | | |
|---|---|---|---|---|
| 4,593,323 A | * | 6/1986 | Kanda | ................ H04N 1/32566 379/100.01 |
| 2006/0152270 A1 | | 7/2006 | Buerkert | |
| 2014/0346987 A1 | | 11/2014 | Becker et al. | |

FOREIGN PATENT DOCUMENTS

| | | |
|---|---|---|
| DE | 102 44 665 A1 | 4/2004 |
| EP | 2 809 019 A1 | 12/2014 |

OTHER PUBLICATIONS

International Search Report for International Application No. PCT/EP2017/068400, dated Nov. 17, 2017, 4 pgs.

* cited by examiner

*Primary Examiner* — Karen Masih
(74) *Attorney, Agent, or Firm* — Dickinson Wright PLLC

(57) ABSTRACT

The present disclosure relates to a fan motor control device comprising a control signal input for applying a rotational speed control voltage as the control signal input signal and a control signal output for picking off a control signal output signal for connecting to a fan motor, where modulation means are connected downstream from the control signal input, said modulation means being designed to convert the control signal input signal into a digital and/or pulsed modulation input signal, and isolated transmission means are connected downstream therefrom, which transfer the digital and/or pulsed modulation input signal into a digital and/or pulsed modulation output signal isolated from the control signal input, which is converted into the control signal output signal that can be picked off on the control signal output by means of demodulation means connected downstream from the transmission means.

19 Claims, 2 Drawing Sheets

DEVICE FOR ISOLATED FAN CONTROL AND FAN SYSTEM AND CONTROL METHOD

RELATED APPLICATIONS

This application is the U.S. National Phase under 35 U.S.C. § 371 of International Application No. PCT/EP2017/068400, filed Jul. 20, 2017, which in turn claims the benefit of German Application No. 10 2016 119 826.9, filed Oct. 18, 2016, the contents of which are incorporated herein by reference in their entirety.

FIELD

The present disclosure relates to a fan motor control device for connection to an electronic control system of a fan motor according to the preamble of the main claim. Furthermore, the present disclosure relates to a fan system, comprising a fan motor control device according to the present disclosure and a fan motor electronic system, which is connected at the control signal output and can energize a stator winding of the fan motor.

BACKGROUND

Control devices for fan motors are known in general in the form of conventional, current market devices from the generic prior art. In the simplest embodiment, having been reduced to a minimum of components, such a control device receives an input signal and forwards it as a control signal to an electronic control system. The fan motor can be turned on and off by the control signal, and the rotational speed setting, which influences the air volume flow of the fan and thus the cooling power of the fan, can be controlled by means of the control signal via a currently set control voltage within the scope of a voltage range.

Since fans are used in a variety of applications, configurations of fan systems are varied accordingly. Generic fan systems are used for cooling logic units, for example, in particular digital signal processors or microcontrollers. To allow the use of various fans, regardless of manufacturer, there are standardized fan housings, which usually comprise electronic control systems provided on a circuit board inside the housing as well as a fan motor provided for them.

These systems have a signal input, to which variable dc voltages, as mentioned, alternatively a pulse-width-modulated control signal (input signal), can be connected via a signal input, for example, so that the rotational speed and thus the cooling power of the fan can be controlled. Thus, for example, fan systems that can be supplied with a dc voltage of up to 12V, alternatively up to 5V, have become well established for logic units. This allows rapid and simple integration of such a fan into an existing system with the supplied voltages already available. Alternatively, a supply voltage and/or control voltage can also be generated by a suitable rectifier and/or power supply unit from an existing line voltage.

For safety reasons and with regard to the most universal possible usability of the technology, it is often desirable to provide electrical isolation in such a system to prevent problematical differences in potential in the event of a fault. It is to be assumed here as fundamentally known that such electrical isolation should be provided in the context of a power supply unit electronic system, which then offers a suitably isolated supply voltage.

However, such an electrically isolated approach requires all of the electric power provided by means of the power supply unit to be isolated electrically —with the corresponding complexity of components and dimensions. Such an isolating transformer is both bulky and expensive because of the potentially limited installation space.

On the whole, the restricted installation conditions, in particular with the space conditions that apply to the fan housings discussed here, which have been standardized in dimensions and/or in installation space, represent limits, within which individual approaches with electrical isolation can be accommodated only at great expense. To be sure, a smaller fan motor accordingly could then be installed in a standardized housing accordingly, but this would in turn reduce the usable cooling power, which would have negative effects. In any case, an approach involving electrical isolation would require additional electronic modules in the form of auxiliary circuit boards, for example, unless not already offered by an upstream power supply unit, but for the reasons already discussed, this is often impossible due to the installation conditions.

SUMMARY

Against the background of the prior art under discussion, the present disclosure provides an improved fan motor control device according to the preamble of claim 1, such that electrical isolation between the control signal input and a control signal output to be provided for the fan motor can be provided in a simple, inexpensive and compact manner. This control signal output may be accommodated with a fan motor in a shared fan housing in particular and will restrict the available housing volume to the least possible extent. Furthermore, a system utilizing such a fan motor control device is to be created, and a system for operating a fan motor control device is to be formed.

A fan motor control is provided according to the preamble of the main claim. Advantageous refinements of the present disclosure are described further herein and in the dependent claims.

Furthermore, protection is claimed within the scope of the present disclosure for a system having such a fan motor control device in combination with a fan motor electronic system, which is provided for direct energization of stator coils of a fan motor, more preferably being integrated into a shared fan housing. Protection within the scope of the present disclosure is also claimed for a method for controlling a fan motor according to independent patent claim 14, wherein both independent system claim 11 (and independent method claim 14) may each be applicable independently but in particular also with reference back to the fan motor control device according to the main claim.

To avoid repetition, features disclosed pertaining to the system and/or device as well as those pertaining to the method shall be considered as applicable and claimed and as improving upon the method according to the present disclosure inasmuch as that is reasonable. Likewise, features disclosed as pertaining to the method within the scope of the present patent application shall also be considered as disclosed and claimed according to the system and/or device, inasmuch as the system according to the present disclosure and/or the device according to the present disclosure is/are also provided for implementation of the method features disclosed here, inasmuch as this is technically reasonable.

In an advantageous manner according to the present disclosure, the fan motor control device according to the present disclosure overcomes the disadvantages of the prior art as described, namely first in that the fan motor control device is provided with transmission means, which ensure electrical isolation of the control signal input signal connected to the control signal input, in particular isolation of a rotational speed control voltage in combination with modulation means provided at the input end and demodulation means provided at the output end. An isolated control signal output signal can thus be tapped at the control signal output and can drive a connected fan motor. The control signal input signal is converted to a digital and/or pulsed modulation input signal by the modulation means. The analog input signal connected at the control signal input may fluctuate in a predetermined value range in accordance with a control setting, wherein the operating limits of the fan, i.e., the minimum and maximum rotational speeds of the fan, for example, are controlled at the maximum and minimum levels of the control signal. These rotational speed stipulations are then in the form of the digital and/or pulsed modulation input signals generated by the modulation means, wherein this modulation especially preferably and suitably provides pulse width modulation of the input signal. Alternatively, however, a digital signal in the form of a bit stream, the value of which fluctuates between logic zero and logic one, such that the mean value over a defined period of time maps the rotational speed control voltage applied at the control signal input.

The digital and/or pulsed modulation input signal is then converted by transmission means to a digital and/or pulsed modulation output signal. In doing so, the electrical isolation is overcome by the signal, which is why the modulation output signal is then based on a ground potential, which is isolated from the input and deviates in potential. This is therefore an isolated modulation output signal, which is converted next via downstream demodulation means into a control signal output signal, in particular an analog signal, which can be tapped at the control signal output for control of the connected motor.

In other words, the analog input signal, in particular a dc voltage signal, is digitized first to convert it to a pulsed and/or digital input signal, which is in turn converted to a pulsed and/or digital output signal, and thereby overcomes the electrical isolation, so that the result is an output signal isolated electrically from the input. Next, the digital output signal is converted back (demodulated) into an output signal that is (again) an analog output signal in particular and can be tapped at the output. Alternatively, however, an embodiment in which the fan motor electronic system receives a digital signal directly is also conceivable. To this extent, the control signal output signal according to the present disclosure is preferably an analog dc voltage signal in a specified voltage band. However, the present disclosure also provides for a digital character of this control signal output signal. To this extent, only the suitability of the fan motor, which is to be connected subsequently (and/or its fan motor electronic system) is important for processing of this signal of the fan motor control device on the output end.

In a particularly preferred embodiment of the present disclosure, the control signal input is designed so that a variable control voltage, in particular a rotational speed control voltage, preferably with a voltage minimum and a range between 3.3V and 20V, especially preferably between 5V and 15V, most especially preferably between 5V and 10V, can be applied to it. In doing so, a predetermined voltage interval from the 0V level is maintained, which makes the control signal less susceptible to interference, in particular in the form of emitted EMC.

It is advantageous according to the present disclosure that this measure achieves a power supply voltage for electronic systems associated with the transmission means on the input end in light of the object according to the present disclosure, namely that operating voltage supply means are connected downstream from the control signal input, forming a power supply voltage for the electronic system associated with the transmission means at the input end from the predetermined voltage level having a positive dc voltage component (offset), which is positive at each operating point in particular. Thus, with its averaging and/or smoothing properties, a buffer capacitor, for example, may be provided, supplying a power supply dc voltage for the electronic system to be provided at the input end, such as the integrated amplification circuits to be discussed below.

Alternatively, a dc/dc converter may also be provided for this purpose, to ensure a constant supply voltage to be provided at the input end for this electronic system. This dc/dc converter is designed in particular as a quadrature regulator or an in-phase regulator for a constant power supply voltage for this electronic system to be provided at the input end and supplies this voltage from the input signal, in particular from the corresponding dc component, which corresponds at least to the minimum voltage (dc voltage component). This permits a compact design of the device, which is advantageous according to the present disclosure because only a few components are needed to generate the power supply voltage necessary at the input end for this power generation for the electronic system to be provided there. It is also advantageously possible to control the fan motor control device according to the present disclosure and at the same time supply power to it via a common connection, namely the control signal input (two pool).

Connections and/or contacts of the control signal output are also designed with two poles in a manner that is advantageous according to the present disclosure, so that they are suitable in a particularly advantageous manner for connection to an electronic control system for a fan motor, with all the advantages in terms of efficiency, cost and installation space thereby achieved. As a result of this measure, advantageous leads for the output signal can also be reduced to a minimum with the associated, low effort and expense for wiring and contacts.

Within the scope of preferred refinements, it is also provided with regard to the advantageous design of the fan motor that it is preferably designed as a single-phase or three-phase dc motor, in particular as a brushless dc motor with the low wear advantageously associated therewith, which is particularly advantageous with regard to the resulting reduction in maintenance cost. At the same time, this advantageous embodiment of the fan motor as a brushless dc motor permits a particularly high motor efficiency over a wide power range.

Again from the standpoint of cost, it is preferable and advantageous according to the refinement of the present disclosure for the modulation means to be implemented without programmed or programmable logic means (for example, the usual microprocessors or microcontrollers with the respective peripherals). It is instead provided according to this refinement that the modulation means are to be designed with a control amplifier and/or operational amplifier wired for digitization of the rotational speed control voltage, which is inexpensive with regard to the component cost as well as high reliability, which is advantageously combined with compact installation space requirements. Use of standardized components, for example, integrated modules with standard operational amplifiers, promises good reliability even under demanding operating conditions of the overall device to be implemented in this way.

In the further concretization of this embodiment, it is provided that the modulation means shall form a Schmitt trigger designed on the basis of such a control amplifier and/or operational amplifier, its inputs being wired in such a way that they compare the analog control signal input signal with an internal auxiliary signal that is periodic and in particular sawtooth. It is especially preferable if the internal auxiliary signal is advantageously generated by using at least one additional operational amplifier, which offers the advantage that an integrated circuit can be used with a plurality of operational amplifiers provided in a shared housing in a compact and inexpensive manner. A typical vibration frequency of the internal sawtooth auxiliary voltage signal is on the order of magnitude of 500 Hz (fundamental mode) and to this extent forms the fundamental frequency of the means of the pulse width-modulated signal generated by the Schmitt trigger.

Another preferred embodiment of the present disclosure provides that the electrically isolating transmission means are implemented as optocouplers and/or an inductive potential isolator. Here again, there are inexpensive standard components such as those based on silicon semiconductor ICs. Another alternative is a capacitive isolator.

An optocoupler thus creates electrical isolation in an otherwise known manner by converting the control signal to a light signal, which can then be converted back to a voltage signal by the optocoupler via a photodiode or a similar detector element, such that the optocoupler makes it possible to have different reference potentials on the primary end and the secondary end. The situation is similar for use of an inductive potential isolator for electrical isolation according to the present disclosure, such that the input signal there is transmitted inductively to an output signal, which has a higher efficiency based on signals of a higher power to be transmitted, also associated with higher cutoff frequencies. However, this variant is less preferred, not least of all because of the greater component complexity and the relatively low modulation frequency, as mentioned above, although this embodiment cannot be ruled out.

With regard to the secondary side of the isolated transmission means, a preferred embodiment of the present disclosure provides for the demodulation to provide an analog low-pass circuit. Again, as with the procedure based on the transmitter primary side, it is advantageous to proceed with a discrete component network and avoiding integrated and/or digital modules. Thus, the simplest demodulation of the signal transmitted by the transmitter can also take place by means of a low-pass filter implemented by a resistor and a capacitor, the output signal of said low-pass filter being sufficient to control the downstream partner at the output end of the device according to the present disclosure. Such a network also makes it possible to implement the desired advantages in terms of compact design and installation space in the context of limited installation space conditions in a fan module, especially preferably when integrated into a (shared) circuit board.

According to a particularly preferred embodiment of the present disclosure, the transmission means are implemented as a dual-channel design, so that a second channel is wired to use in particular another (a second) optocoupler (which is usually and preferably a component of the joint optocoupler housing), having a fan motor-specific signal of the connected fan motor and/or the electronic control system, which is thus led back to the primary side and/or to the input (control signal input). It is then readily possible to tap this feedback signal with an additional signal connection on the input end and to utilize it in a suitable manner for monitoring and/or for other purposes. Thus, in a refinement according to the present disclosure, it is preferable to use such a second channel to feed a measured variable back to the fan motor electronic system (switched off within the scope of the system according to the present disclosure), wherein this may be a rotational speed signal, for example, which is then in the form of a tachometer signal at the input end and is based directly on a signal actually present at the output end. The electrical isolation is also ensured here by the optocoupler. Not least of all, the use of two optocouplers as transmission means is advantageous because standardized components having two optocouplers provided in one housing are wide-spread and inexpensive accordingly.

Within the scope of the present present disclosure, protection is claimed for a system (fan system), in which a fan motor control device according to the present disclosure is combined with a fan motor electronic system, which can then directly energize stator windings of the fan motor. In addition, it is preferably provided that these devices are provided on a shared circuit board or a similar supporting device, and additionally preferably are accommodated in a shared housing, for example, a modular housing that also accommodates the fan motor. The present present disclosure, which has the advantages of compactness and simplicity of the hardware implementation, as discussed above, makes it possible to accommodate the installation space (a typical edge length of such an installed housing is 120 mm) available in conventional fan module housings in a particularly elegant manner, without having to use a smaller fan motor, for example. A typical maximum electrical power (power consumption) of such modules is 15 W, more preferably 10 W and even more preferably 5 W.

Furthermore, protection is claimed within the scope of the present disclosure for a method for operating a fan motor control device in particular a fan motor control device according to the present disclosure, said device implementing essentially the advantages discussed in conjunction with the device according to the present disclosure. Here again, the refinement consists of the voltage offset for an electronic control system to be provided on the primary end, additionally preferably being implemented again without processor units and/or control units (i.e., the dc voltage component) of the control voltage signal to be applied at the input end.

As a result, the present present disclosure achieves effective electrical isolation for switching and/or operating a fan motor in a surprisingly simple, compact and inexpensively implemented manner, wherein such a functionality can be integrated into existing modular housing structures in a particularly compact form without having to create additional external solutions even when space is limited. The present present disclosure is therefore excellently suited for operation of fan motors, wherein use in conjunction with logic units is particularly preferred here, but this by no means limits the scope of applications of the present disclosure. The present disclosure is also suitable in principle for electrical isolation of (dc) consumers outside of fan motor technology.

BRIEF DESCRIPTION OF THE DRAWINGS

Additional advantages, features and details of the present disclosure are derived from the following description of preferred embodiments and on the basis of the drawings, in which

FIG. 1 shows a schematic block of a first embodiment of the fan motor control device 1, in which transmission means 9 according to the present disclosure are arranged on the input end and on the output end, subdividing the fan motor control device 1 according to the present disclosure into electronic systems. At the input end, the fan motor control device 1 receives a rotational speed control voltage, which is carried at the output end to signal output 13 via the control signal input 6, in particular a dual-pole control signal output for connection to a fan motor electronic system 2, which energizes the starter windings of a fan motor 3.

DETAILED DESCRIPTION

Figure 1:
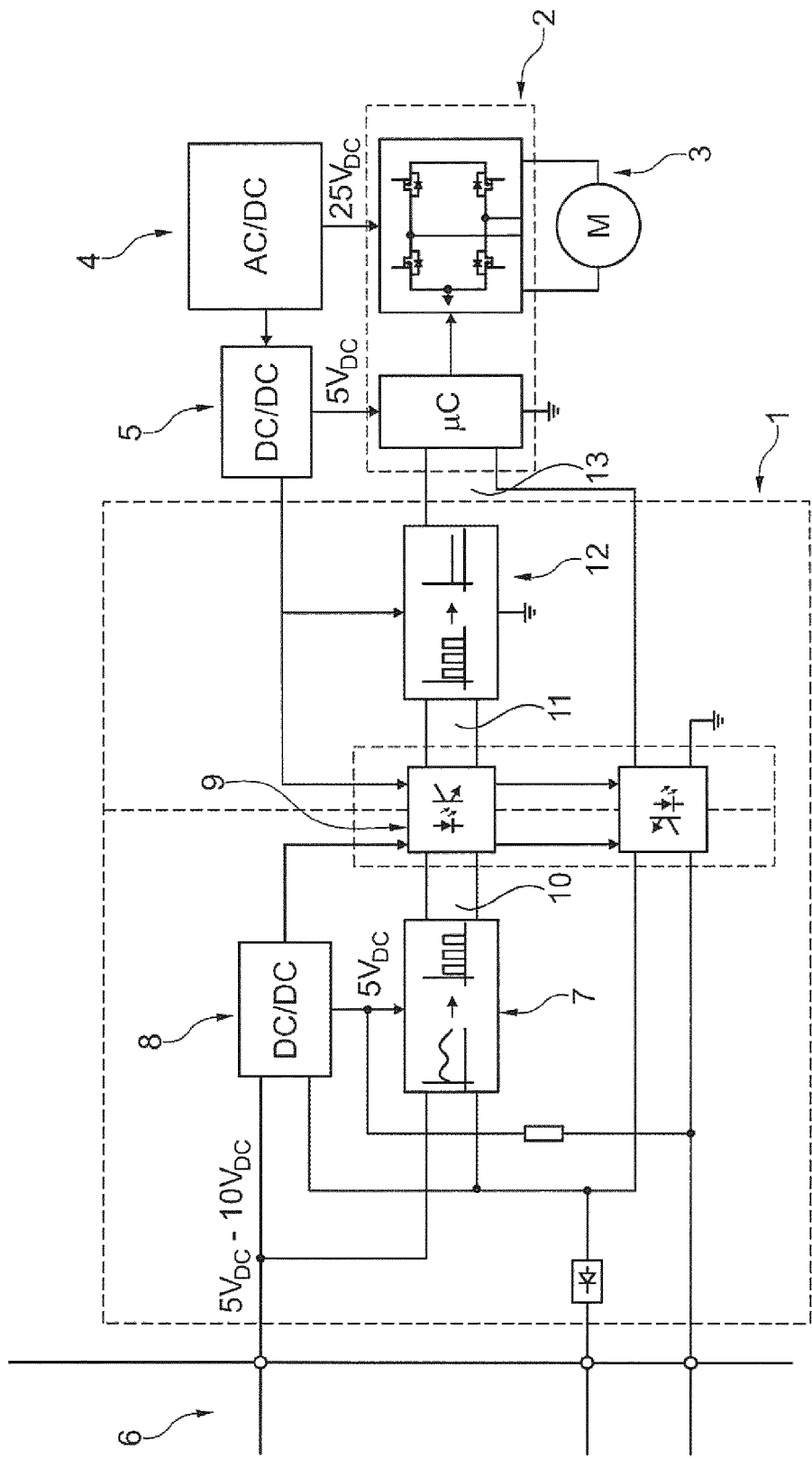
FIG. 1 shows a block diagram of a first embodiment of the fan motor control device according to the present disclosure with a downstream fan motor electronic system of a fan motor.

The transmission means 9 generate an isolated digital and/or pulsed modulation output signal 11 from a supplied digital (i.e., a signal digitized via means 7 described below) and/or pulsed modulation input signal 10. In the embodiment illustrated here, this is accomplished by an optocoupler that converts the modulation input signal 10 by light pulses into modulation output signal 11, which is detected by detector means. In addition, a second channel is provided for the transmission means 9, permitting output of a measurement signal, based on the input side, in particular a tachometer signal of the fan motor electronic system 1.

Operating voltage supply means 8, supplying power to the electronic system arranged at the input end, are provided for the input end. It is advantageous in particular that the operating voltage supply means 8 are supplied with power from a dc voltage component contained in the rotational speed control voltage and form the power supply voltage from this, in particular a dc power supply voltage, with which it is possible not only to advantageously reduce the number of contacts provided at the input end, but also to reduce the complexity and cost of the wiring in assembly of the fan motor control device in addition to achieving lower manufacturing costs.

At the input end, the electronic system is formed by the modulation means 7 as well as proportionally by the transmission means 9 and is thus supplied with power by the operating voltage supply means 8.

The modulation means 7 generate the pulsed and/or digital modulation input signal 10 from the rotational speed control voltage applied at the input end. A preferred embodiment of the modulation means 7 is described in greater detail below in conjunction with FIG. 2.

At the output end, the electronic system is formed by the demodulation means 12 and proportionally by the transmission means 9 and supplied with a power supply voltage via power supply unit 4.

The demodulation means 12 convert the digital and/or pulsed modulation output signals 11 into a control signal output signal that can be tapped at the output of the fan motor control device 1 for connection to a fan motor electronic system 2. In a preferred embodiment, the demodulation means 12 are embodied in the form of a low-pass filter, which is especially preferably embodied by the advantageous circuitry of discrete components, most especially preferably in the form of a resistor and capacitor network.

The rotational speed control voltage is supplied to a fan motor electronic system 2 consisting of electronic components, comprising power electronics and energizing the stator windings of a dc fan motor 3, designed as a dc motor, preferably a single phase or three-phase dc motor, preferably brushless. The fan motor electronic system 2 is supplied with power via the power supply unit 4 connected to an ac current system (not shown); the power supply unit generates a dc voltage from the line voltage in a known manner. The dc voltage is converted by another dc voltage converter 5 into another dc voltage, in particular a voltage of a different value, supplying power to the electronic system of the fan motor control device 1 situated on the output end, in addition to supplying power to logic units and components of the fan motor electronic system 2.

An embodiment, in which the fan motor control device 1 according to the present disclosure and the fan motor electronic system 2 are both arranged on a circuit board, is particularly preferred. It is additionally preferred that the circuit board is arranged in a housing having side lengths between 115 mm and 125 mm, which is also associated with the fan motor 3, together forming a module. This standardization (the dimension of the circuit board is one example) ensures a broad field of use for the device as well as the system according to the present disclosure because it can replace established and widely used systems having an identical module size.

Variants of the fan motor control device according to the present disclosure are also possible, in which the demodulation means 12 deliver a digital control signal output signal, which is processed further in the fan motor electronic system 2 for controlling the fan motor 3.

Figure 2:
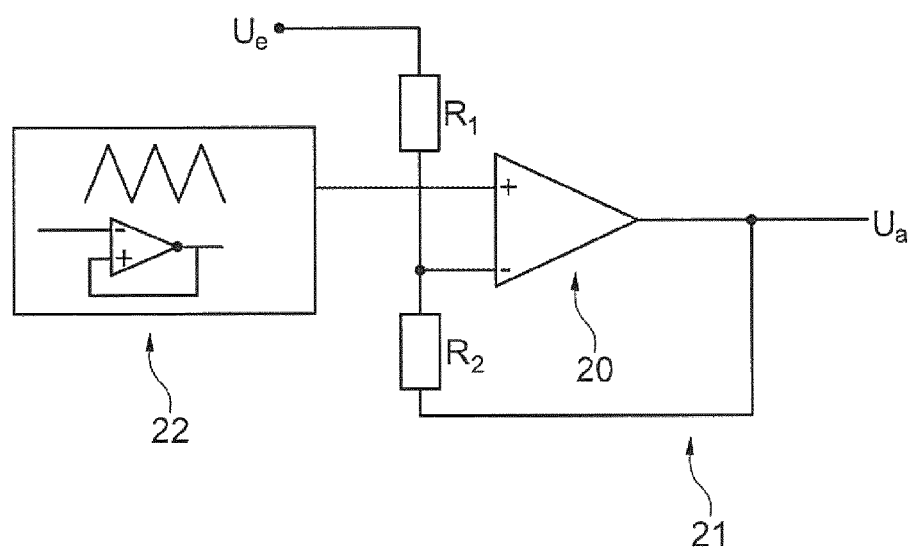
FIG. 2 shows an embodiment of the modulation means implemented by the circuitry of electronic components comprising an operational amplifier.

FIG. 2 shows an embodiment of the modulation means 7, in which electronic components, comprising operational amplifiers 20, are combined in an otherwise known type of Schmitt trigger. The circuit compares the rotational speed control voltage applied at the control signal input 6 with an internal auxiliary signal. This auxiliary signal is a sawtooth voltage signal having a fundamental frequency of 500 Hz, for example, generated here by means of another operational amplifier having of an arrangement of electronic components as an example. In the present case, the arrangement is given as an example and is preferably designed as a sawtooth generator 22 having an integrated operational amplifier. In a particularly preferred embodiment, the two operational amplifiers are combined for generating the auxiliary signal and for the design of the Schmitt trigger in a shared component housing, which advantageously supports the compact design of the fan motor control device 1 and permits inexpensive acquisition of components. The Schmitt trigger forms the modulation output signal, in that it outputs a level varying between logic one and logic zero at the output end with a correspondence in the voltage signal levels applied at the input, thus resulting in digitization of the analog signal applied at the input.

LIST OF REFERENCE NUMERALS 1 fan motor control device
2 fan motor electronic system
3 fan motor
4 power supply unit
5 dc voltage converter
6 control signal input 7 modulation means
8 operating voltage supply means
9 transmission means
10 digital and/or pulsed modulation input signal
11 digital and/or pulsed modulation output signal
12 demodulation means
13 control signal output -
20 operational amplifier
21 Schmitt trigger
22 sawtooth generator

The invention claimed is:

1. A fan motor control device, comprising a control signal input for applying a rotational speed control voltage as a control signal input signal and a control signal output for tapping a control signal output signal for connection to a fan motor, wherein
connected downstream from the control signal input are modulation means, which are designed for converting the control signal input signal into a digital and/or pulsed modulation input signal and which are upstream from isolating transmission means that transmit the digital and/or pulsed modulation input signal to a digital and/or pulsed modulation output signal isolated from the control signal input, said modulation output signal being converted by demodulation means downstream from the transmission means into the control signal output signal tappable at the control signal output; and
operating voltage power supply means are connected downstream from the control signal input and from a power supply voltage for electronic system(s) provided for the transmission means at an input end from a predetermined dc voltage component of the control signal input signal.

2. The device according to claim 1, wherein
the control signal input is designed so that the rotational speed control voltage can be applied to the control signal input with a minimum voltage, including a predetermined voltage interval from the 0V level, wherein a range of the rotational speed control voltage between 3.3V and 20Vcan be applied.

3. The device according to claim 1, wherein
the control signal output is designed with two poles for connection to the fan motor.

4. The device according claim 1, wherein
the fan motor is designed as a dc motor.

5. The device according to claim 1, wherein
the modulation means are implemented without programmed or programmable logic means and are designed with a control amplifier and/or an operational amplifier wired for digitization of the rotational speed control voltage.

6. The device according to claim 5, wherein
the modulation means have a Schmitt trigger, which is designed based on an operational amplifier and compares a periodic, sawtooth, internal auxiliary signal with the control signal input signal, wherein the internal auxiliary signal is preferably generated by means of another operational amplifier.

7. The device according to claim 1, wherein
the isolating transmission means have an optocoupler and/or an inductive isolator, implemented by a standardized integrated circuit and/or a capacitive isolator.

8. The device according to claim 1, wherein
the demodulation means have an analog low-pass circuit, constructed from discrete components by connecting a resistor to a capacitor.

9. The device according to claim 1, wherein
the transmission means are implemented in two channels so that a second channel is arranged for isolated feedback of a fan motor-specific signal of the connected fan motor, in particular utilizing a second optocoupler of a joint optocoupler housing of the transmission means, for tapping at an additional signal connection on the input end.

10. A fan system, comprising a fan motor control device according to claim 1, and further comprising a fan motor electronic system controlled by the control signal output and driving stator windings of a fan motor.

11. The fan system according to claim 10, wherein
the fan motor control device and the fan motor electronic system are arranged on a circuit board and/or are arranged in a shared fan housing.

12. The fan system according to claim 11, wherein
a side dimension of the fan housing is in a range between 110 mm and 130 mm, in particular between 115 mm and 125 mm, and/or the maximum power consumption by the fan motor electronic system is 15 Wor 10 W or 5 W.

13. The device according to claim 2, wherein
the range of the rotational speed control voltage between 5V and 15V can be applied.

14. The device according to claim 2, wherein
the range of the rotational speed control voltage between 5V and 10V can be applied.

15. The device according claim 4, wherein the fan motor is a single-phase motor or a three-phase motor.

16. The device according claim 1, wherein the fan motor is brushless.

17. The fan system according to claim 11, wherein a side dimension of the fan housing is in a range between 115 mm and 125 mm.

18. A method for controlling a fan motor by operating a fan motor control device according to claim 1, comprising the following steps:
Applying a variable rotational speed control voltage having a dc voltage component at the control signal input;
Generating a modulation input signal, which is pulsed and/or digital, from the rotational speed control voltage at the input end by means of modulation means provided,
Transmitting the modulation input signal by means of isolating transmission means into a digital and/or pulsed modulation output signal isolated from the control signal input; and
Converting the digital and/or pulsed modulation output signal by the demodulation means provided into a control signal output signal that can be tapped at the control signal output for the fan motor.

19. The method according to claim 18, wherein
the control signal output signal is applied to a fan motor electronic system, which energizes stator windings of the fan motor, as the fan motor being a single-phase or three-phase brushless dc motor.

* * * * *